(12) United States Patent
Ullanoormadam

(10) Patent No.: US 7,618,670 B2
(45) Date of Patent: Nov. 17, 2009

(54) TRANS FREE NON-HYDROGENATED HARD STRUCTURAL FAT AND NON-HYDROGENATED HARD PALM OIL FRACTION COMPONENT

(75) Inventor: Sahasranamam Ramasubramaniam Ullanoormadam, Kuala Lumpur (MY)

(73) Assignee: Premium Vegetable Oils SDN. BHD. (MY)

( * ) Notice: Subject to any disclaimer, the term of this patent is extended or adjusted under 35 U.S.C. 154(b) by 623 days.

(21) Appl. No.: 10/866,982

(22) Filed: Jun. 14, 2004

(65) Prior Publication Data

US 2005/0276900 A1 Dec. 15, 2005

(51) Int. Cl.
  A23D 9/00 (2006.01)
(52) U.S. Cl. ..................... 426/607; 426/417
(58) Field of Classification Search .............. 426/607
  See application file for complete search history.

(56) References Cited

U.S. PATENT DOCUMENTS

| | | | |
|---|---|---|---|
| 4,055,679 A | 10/1977 | Kattenberg et al. | |
| 4,214,012 A | 7/1980 | Ainger et al. | |
| 4,360,536 A | 11/1982 | Keuning et al. | |
| 4,410,557 A | 10/1983 | Miller | |
| 4,839,191 A | 6/1989 | Luddy et al. | |
| 5,231,200 A | 7/1993 | Kuwabara et al. | |
| 5,401,867 A | 3/1995 | Sitzmann et al. | |
| 5,547,698 A | 8/1996 | Lansbergen et al. | |
| 5,602,265 A | 2/1997 | van den Kommer et al. | |
| 5,621,125 A | 4/1997 | Smith et al. | |
| 5,667,837 A | 9/1997 | Broomhead et al. | |
| 5,849,940 A | 12/1998 | Harris et al. | |
| 5,858,445 A | 1/1999 | Huizinga et al. | |
| 5,872,270 A | 2/1999 | van Dam et al. | |
| 5,874,599 A | 2/1999 | Harris et al. | |
| 5,879,735 A | 3/1999 | Cain et al. | |
| 5,888,575 A | 3/1999 | Lansbergen et al. | |
| 6,156,370 A | 12/2000 | Huizinga et al. | |
| 6,238,723 B1 | 5/2001 | Sassen et al. | |
| 6,808,737 B2 * | 10/2004 | Ullanoormadam | 426/603 |
| 2005/0069620 A1 * | 3/2005 | Ullanoormadam | 426/603 |

FOREIGN PATENT DOCUMENTS

| | | |
|---|---|---|
| CA | 2 098 314 | 12/1994 |
| EP | 0 209327 A2 | 1/1987 |
| EP | 0 399 597 A2 | 11/1990 |
| GB | 1245539 | 9/1971 |
| GB | 2 270 925 A | 3/1994 |
| GB | 1147475 | 9/1996 |
| WO | WO 96/19115 | 6/1996 |

OTHER PUBLICATIONS

Gibon, V. 2002. Latest trends in Dry Fractionation. Lipid Technology, Mar. 2002, p. 33.*

Willner, T. 1994. High-Pressure Dry Fractionation for Confectionery Fat Production. Lipid Technology May/Jun. 1994. p. 57.*
Gosh, S. 1997. Utilization of High-Melting Palm Stearin in Lipase-Catalyzed Interesterification with Liquid Oils. JAOCS 74(5)589.*
Hui, Y.H. 1996. Bailey's Industrial Oil and Fat Products, 5th edition, vol. 4, John Wiley & Sons, Inc. , NY, pp. 301, 307-323, 326-329.
Siew, W.L. et al. 1993. Identity Characteristics of Malaysian Palm Oil Products: Fatty Acid and Triglyceride Composition and Solid Fat Content. ELAEIS 5(1)38-46.
Kheiri, M.S.A. 1985. Palm Oil Products in Cooking Fats. JAOCS 62(2) 410-416.
Van Duijm, Technical aspects of trans reduction in margarines, OCL, vol. 7, No. 1, Jan./Feb. 2000.
Van Den Kommer et al., Developments in Dry Fractionation of Fats, SCI Lecture Papers Series, London, Mar. 9, 1994.
Kun et al., Palm Oil Development, Palm Oil Research Institute of Malaysia, Mar. 1992.
Taylor, 1976. Oleagineux 31(2)73-79.
Willner, et al., High Pressure Dry Fractionation for Confectionery Fat Production. Lipid Technology May/Jun. 1994, p. 57-60.
Tan, 1991. PORIM Survey 1979/1980. PORIM Technology, Palm Oil Research Institute of Malaysia, vol. 4, p. 1-6.
Zaliha, et al., 2003. Food Chemistry 86: 245-250.
Duns 1985. Palm Oil in Margarines & Shortenings.
Deffense, 1985. Fractionation of Palm Oil.
Rossell, 1985. Fractionation of Lauric Oils.
Tirtiaux, 1989. Dry Fractionation—A Proven Technology (Lipid Technology).
Kellens, 1996. Developments in Fractionation Technology (Palm Oil Research Institute, Malaysia, Kuala Lumpur) p. 335-345.

(Continued)

*Primary Examiner*—Carolyn A Paden
(74) *Attorney, Agent, or Firm*—St. Onge Steward Johnston & Reens LLC

(57) ABSTRACT

A trans free non hydrogenated high C-16 type palm fat suitable for the manufacture of trans free non hydrogenated hard structural fat that is being suitable for use in the manufacture of low SAFA (Saturated Fatty Acid) poly/mono unsaturated margarine and spreads and shortening and fat blends incorporating such hard Structural fat. The Structural fat is made from selectively fractionated non-hydrogenated high melting palm oil fraction with a C-16 fatty acid residue of at least 70%, which is subjected to chemical random interesterification using alkaline metal catalyst such as sodium methoxide/sodium methylate, with a dry fractionated non hydrogenated hard palm kernel stearin fraction. The structural fat that is produced has high yield ratios that can be economically and commercially incorporated in the oil blends for the manufacture of trans free margarine/spreads/shortening as well as other plastic W/O emulsions. Also described is a process for the manufacturing such structural fat as well as hard palm fraction including process for the manufacture of extra hard trans free structural fat by panning and pressing of above structural fat.

2 Claims, No Drawings

OTHER PUBLICATIONS

Gibon, et al., 2002. Latest Trends In Dry Fractionation (Lipid Technology) March p. 33-36.

Swern, et al. 1979. Bailey's Industrial Oil and Fat Products, vol. 1, 4th ed. , John Wiley & Sons, NY, p. 19.

Firestone, 1999. Physical and Chemical Characteristics of Oils, Fats and Waxes. AOCS Press, Champaign, IL, p. 72.

List, G.R. 1995. Preparation and Properties of Zero Trans Soybean Oil Margarines. JAOCS 72:383.

List, G.R. et al. 1995. Margarine and Shortening Oils by Interesterification of Liquid and Trisaturated Triglycerides. JAOCS 72:379.

List, G.R. et al. 1977. "Zero trans" Margarines: Preparation, Structure, and Properties of Interesterified Soybean Oil-Soy Trisaturate Blends. JAOCS 54:408.

List, G.R. et al. 1997. Effect of Interesterification on the Structure and Physical Properties of High-Stearic Acid Soybean Oils. JAOCS 74:327.

Ray, S. et al. 1996. Comparative Nutritional Quality of Palmstearin-Liquid Oil Blends and Hydrogenated Fat (vaanaspati). JAOCS 74:617.

Ghosh, S. et al. 1997. Utilization of High-Melting Palm Stearin in Lipase-Catalyzed Interesterification with Liquid Oils. JAOCS 74:589.

Aini, I. et al. 1999. Trans-Free Vanaspati Containing Ternary Blends of Palm Oil-Palm Stearin-Palm Olein and Palm Oil-Palm Stearin-Palm Kernel Olein. JAOCS 76:643.

Petrauskaite, V. et al. 1998. Physical and Chemical Properties of Trans-Free Fats Produced by Chemical Interesterification of Vegetable Oil Blends. JAOCS 75:489.

Kok, L. et al. 1999. Trans-Free Margarine from Highly Saturated Soybean Oil. JAOCS 76:1175.

Heckers, H. 1978. Trans-isomeric fatty acids present in West German margarines, shortenings, frying and cooking fats. Am. J. of Clinical Nutrition 31:1041.

D'Souza, V. et al. 1991. Chemical and Physical Properties of the High Melting Glyceride Fractions of Commercial Margarines. JAOCS 68:153.

Schweitzer III, 1994. Developments in Dry Fractionation of Fats from Oils and Fats Group symposium Fractional Crystallisation of Fats held in London on Mar. 8, 1994, 0040.

* cited by examiner

TRANS FREE NON-HYDROGENATED HARD STRUCTURAL FAT AND NON-HYDROGENATED HARD PALM OIL FRACTION COMPONENT

BACKGROUND OF THE INVENTION

Historically emulsified fat system in margarine/spreads has been designed to satisfy customer requirements such as significant cooling impact, a rapid sharp melt sensation, and no coated or waxy feel on the tongue. In addition, it should impart temperature cycling stability (heat stability) as well as spread ability when taken out frequently from the refrigerators is the prominent features.

To achieve these objectives, margarine fat blend is being formulated using hard stocks derived by hydrogenation of liquid oils.

However, with the adverse effect of Trans fatty acids being published, consumers are looking for margarine/spreads with practically no trans fatty acids. Recent studies have indicated that trans fatty acids produced during the hydrogenation process is considered much more harmful compared to saturated fatty acids (SAFA). Low trans fatty acid levels can be achieved by using fully hydrogenated fats as structural fat, which usually does not contain trans fatty acid or very negligible amount. Such hydrogenated fats were subjected interesterification with lauric fats and solvent fractionated to derive premium quality structural fat that could be incorporated in smaller level to produce Low SAFA products.

Hydrogenation process is generally viewed as the main reason for the development of trans fatty acids in oils and fats. Hence, there is a strong consumer perception against usage of and hydrogenated oil/fat in the food products including margarine/spreads/shortening. Further use of organic solvent as well detergent for fractionation process are viewed by the consumers are unhealthy processing.

Hence research work is being carried out for developing margarine/spreads and shortening using no hydrogenated oils in their hard stock at the same time looking at the possibility of reducing the saturated fatty acid levels (SAFA) in the products At the same time work were carried out to develop new fractionation process to eliminate usage of solvent/detergents in the fractionation process.

For manufacturing Margarine/Spreads, the fat blend should be such that it has a flat melt profile from 5 to 30 Deg C. at the same time low solids at 35 and 40 deg C. so that the product has good mouth feel. The blend should be such that the product does not oil out and has good temperature cycling stability.

Further in recent years due to high publicity in the media with respect to adverse effect of Saturated as well as trans fatty acids, many manufacturers have taken a nutritional approach to manufacture the product by reducing the saturated as well as trans fatty acids and increasing poly/mono unsaturated fatty acids in the margarine/spreads as well as shortening.

Margarine/Spreads have been on the market for some time aiming to meet this need. Typically, the margarine fat of these products consists of about 87% liquid oil, e.g. sunflower oil and 13% of a hard stock consisting of a random interesterified mixture of fully hardened lauric fat, e.g. fully hardened palm kernel oil, and fully hardened palm oil.

Attempts have been made over the years to formulate margarine/spread blends by using much lower levels of hard stock. For example EP 89,082 recommended $H_2M$ rich hard stocks. The preferred method described in EP 89,082 for producing such hard stock is randomly interesterifying a partly or fully hydrogenated lauric fat having a melting point ranging from 30 to 41 degree. C., with a fat, which can be fully or partly hydrogenated, fractionated or non-fractionated, wherein at least 60% of the fatty acid residues are $C_{16}$- or $C_{18}$-fatty acid residues. This $C_{16}$-$C_{18}$ fat is preferably selected from palm fat, soybean oil, groundnut oil, sunflower oil, maize oil, and rapeseed oil, having a melting point ranging from 50 to 71.degree. C.; and fractionating the interesterified mixture. Fractionation is preferably done in an organic solvent. The examples of EP 89,082 illustrate spreads comprising margarine fats containing 90 or even 93% sunflower oil and only 7 or 10% hard stock. This hard stock is produced by means of 2-stage fractionation in acetone to obtain a mid fraction of a random interesterified mixture of 50 parts fully hydrogenated palm kernel fat and 50 parts fully hydrogenated palm fat.

Thus EP 89,082 met the objective of manufacture of Margarine/Spreads with very Low SAFA as well as very PUFA/MUFA by producing a hard Structural fat that can be used at levels as low as 4%.

However, recently consumers have been expressing concern about chemically modifying fats e.g. by hydrogenating or hardening, which result in trans fatty acid residues if partial hardening is involved. Also consumers have been voicing their concern over use of solvent such as Acetone etc as well detergents for fractionation of fats. Even though full hydrogenation eliminates the presence of trans fatty acid residues, still there is a consumer perception that any hydrogenated product is undesirable. Because of this the manufacturers of margarine/Spreads have been looking for alternate hard stock, which do not undergo hydrogenation as well as solvent fractionation processes. To meet the need for spreads with low contents of SAFA in the margarine fat which have been produced without using hydrogenation, CA 2 098 314 proposes to prepare hard stock by chemically interesterifying a blend of generally equal proportions of palm stearin and palm kernel stearin.

However the usage level of such hard stock was 14-21% especially about 16% to obtain a good quality product. This high level of usage resulted in higher level of SAFA in the final products. Hence attempts have been made to prepare hard stock that can be used at much reduced levels of even 5 to 14%. This objective was reached to a considerable extent in recent years. For Example in U.S. Pat. No. 5,858,445, U.S. Pat. No. 6,156,370, CA 2207954, as well as in WO 96/19115, the inventers have found that a hard structural fat that can be used at level of 5-14% can be produced with out Solvent fractionation, random chemical interesterification as well as hydrogenation process that has been used in EP 89,082. Accordingly, the invention provides a margarine fat blend essentially comprising 86-95% liquid oil and 5-14% of a hard stock, this hard stock being a stearin fraction of an enzymatically interesterified mixture of 25-65%, and preferably 35-55%, unhardened lauric fat stearin and 75-35%, and preferably 65-45%, unhardened $C_{16}$+ fat stearin.

By selecting unhardened natural vegetable fat products having sufficient saturated fatty acids, such as lauric fat fractions and palm oil fractions for the enzymatic interesterification, the chemical modification of the fats were reduced to a minimum and the trans fatty acid level in the final fat blend were to almost zero.

The hard stock produced from un-hydrogenated fat under U.S. Pat. No. 5,858,445, U.S. Pat. No. 6,156,370, CA 2207954 and WO 96/19115, could achieve quite similar results with respect to the nutritional properties of the spread as in EP 89,082. How ever EP 89,082 focus on fully concentrates on achieving the minimum SAFA content in the product with acceptable product properties and heat cycling stabilities. To meet this requirement, the inventors used all the fat modification techniques including hydrogenation, chemical interesterification, solvent fractionation and even chemical synthesis of triglycerides.

By using Structural fat produced under U.S. Pat. No. 5,858,445, U.S. Pat. No. 6,156,370, CA 2207954 and WO 96/19115 the inventers could substantially match the performance of EP 89,082 without using Hydrogenation, solvent fractionation, and chemical interesterification. However to achieve this, they had to resort to expensive multi stage dry fractionation process as per EP 399,597 to produce hard palm C16 fraction. Further, they had to use expensive enzymatic interesterification process for interesterification of Lauric fat as well as palm fat. Further, the interesterified fat was required to undergo an additional dry fractionation process at 31-41 Deg C. to produce hard Structural fat for use in margarine blend. Solvent fractionation process improved the yield of the hard fraction but is considered very expensive and not natural because of usage of solvent in the process. Such solvent fractionation plant are highly capital intensive and require very high safety and environmental feature. This, however, resulted in low yields of structural fat ranging from 14 to 45%. Since this process produced excessive olein fraction (liquid fraction) as a byproduct, alternate use for olein fraction need to be found to get economical value for such fraction. This resulted in the process being commercially un-attractive. Further, inventors used enzymatic interesterification method. To date, the cost of immobilized enzymes required and high capital and variable processing cost involved has made this process un competitive with respect to chemical random interesterification process. This is especially true in case of manufacture of low value products like fats for margarine/spreads/shortening.

Further, many consumers do not consider enzymatic interesterification as a "truly" natural process. For example, in recent EU Parliament directive No. 20000/36/EC of 23 rd Jun. 2000 relating to cocoa and chocolate products intended for human consumption, has prohibited use of vegetable fat which has under gone "enzymatic" fat modification of the triglyceride structure. Further, many of the new enzymes are produced by genetic modification and there is again very strong consumer perception against products derived using genetically modified substances.

We, therefore, consider random chemical interesterification process is more "natural" and a mild process as the alkaline metal catalyst, namely, sodium methoxide used in the process breaks down as sodium hydroxide. Sodium hydroxide has been used historically and even to day for the refining of soft oils such as soybean, sunflower, canola etc and such refined oil is consumed widely and even for manufacture of margarine/spreads. Further, chemical interesterification is a well known art in the industry and needs low level of technology and cost.

We, therefore, found that this economic and commercial issue involved could be addressed by inventing a new process to manufacture hard palm fraction that could be interesterified with a hard palm kernel fat. We wanted to avoid further fractionation steps of such interesterified fat so that the yield of structural fat is approx 97%. Even if, a further fractionation step was required to produce extra hard structural fat, the focus was how to improve the yield of such hard stock to level of 65% and above compared to 14-45% that were achieved under U.S. Pat. No. 5,858,445, U.S. Pat. No. 6,156,370, CA 2207954 and WO 96/19115.

BRIEF SUMMARY OF THE INVENTION

To this, our approach was to use single or two stages melt crystalization and dry fractionation method to produce a hard palm stearin fraction with a C+ 16 level of greater than 83% and total saturated fatty acid level of greater than 90%. Further our approach was also to use commercially available palm stearin fraction, which is priced much cheaper to palm oil, with a single stage dry fractionation step to obtain high C-16 hard palm stearin fraction. Further, our objective was to avoid prior art multi stage counter current dry fractionation process to achieve such hard palm stearin fraction which is considered expensive and produced low yield of such hard fraction.

DETAILED DESCRIPTION OF THE INVENTION

It is considered essential to achieve max level of C-16 type fatty acids while enriching C-16 type fatty acids in the palm stearin fraction. If this could be achieved automatically, other saturated fatty acids mainly C-14 as well as C-18 type also get enriched resulting in over all increase of total saturated fatty acids in such hard palm stearin fraction to over 90%. When such fraction is mixed with hard palm kernel stearin fraction with a C-12 level of higher than 52%, the total saturated fatty acid level in the blend exceeds 90%. Higher levels of saturated fatty acids in the blend before interesterification reaction is highly preferred, as this resulted in higher level of tri-saturated triglycerides in the interesterified blend. The reason for this has been explained in detail under the "Detailed Description of The Invention."

This goal was achieved in commercial scale operation in the plant by selectively crystallizing the commercially traded palm stearin fraction and then filtering the slurry through a high pressure membrane press and after completion of filtration, applying high squeeze pressure on the membrane (10-60 bar) so as to squeeze out the occluded liquid oil (olein fraction) in the hard palm stearin fraction recovered in the filter chamber. This high pressure squeezing of the filter cake recovered in the filter resulted in the enrichment of the C-16 fatty acid residue as well as saturated fatty acids levels in the hard steam fraction thus recovered to achieve maximum de-oiling of hard steam fraction, the chamber depth of commercial membrane press were required to be reduced from 40 to 50 mm which is considered as an industrial standard for normal palm oil filtration process to 5-30 mm. High inflation pressure necessitated reduction in chamber depth so that the stretch required in the member is kept as small as possible so that higher pressure could be applied during squeezing operation by inflating the membrane with out over stretching the same due to excess expansion. Applying of higher squeezing pressure resulted in enrichment of C-16 fatty acid residue level to over 80%, in the hard stearin fraction thus obtained. This also increased total saturated fatty acid level in the hard stearin fraction.

It was difficult to obtain such hard palm stearin fraction in the prior art processes, even by solvent fractionation method as well as expensive multi stage counter current dry fractionation method. This could be seen in the examples given in the prior art process, wherein the C-16 level in the hard palm fat obtained was only 79.4% and the level of total saturated fat in this fat was only 84.6%, even though it was produced by using expensive multi stage counter current fractionation method.

Even usage of very expensive solvent fractionation process yielded a hard palm stearin fraction with a C-16 level of only 77.9% only as given in the examples of the prior art processes.

DETAILED DESCRIPTION OF THE INVENTION

The present invention is concerned with a hard high C-16 type palm stearin fraction as well as a trans free hard structural fat suitable for the manufacture of low SAFA (Saturated Fatty Acid) poly/mono unsaturated margarine and spreads and fat blends as well as W/O emulsions. The structural fat is made from selectively fractionated non-hydrogenated, high C-16 type palm oil stearin fraction, which is subjected to random chemical interesterification using alkali metal catalyst such as sodium methoxide/sodium methylate, with a dry fractionated non-hydrogenated hard palm kernel stearin fraction to obtain hard structural fat with high yield ratios that can be economically and commercially incorporated in the oil blend for the manufacture of trans free, low SAFA, high poly unsaturated/mono unsaturated margarine/spreads/shortening and other food preparations.

Abbreviations: FA=fatty acid, FAC=fatty acid composition, PUFA=poly-unsaturated acid(s), SAFA=saturated fatty acid(s), MUFA=Mono unsaturated Fatty Acids, H=saturated FAs with carbon numbers greater than or equal to 16, M=saturated FAs with carbon numbers less than or equal to or les than 14. H-3 refers to triglycerides with 3-carbon chain of length C16 and above that are saturated. $H_2M$ refers to triglycerides which has 2 carbon chain that are C16 and above and saturated and one chain of carbon length C 14 and below. Tg's=tri glycerides.

In this description all parts, proportions and percentages are by weight; the amount of fatty acids in an oil or fat is based on the total amount of fatty acids in said oil or fat and the amount of hard stock and/or hard fat in the fat composition is based on the total weight of said fat composition, unless otherwise stated.

The solid fat content (SFC) in this description and claims is expressed, as N-value using nuclear magnetic resonance method. The method used is IUPAC method 2.323. The fat is heated to a temperature of 80.degree. C and filtered and filled in SFC tubes Maintain at 60 Deg for at least 5 minutes, keeping the sample for 1 hour at 0.degree. C. And then 30 minutes at the measuring temperature. The SFC values are measured using Bruker Minispec-120 instrument.

For a better understanding of the invention some practical embodiments thereof has been described in the following examples. Parts and percentages as used in these examples, the description and the claims refer to weights unless otherwise indicated. For manufacturing spreads may be referred to various text books, e.g. The Chemistry and Technology of Edible Oils and Fats and their High Fat Products by G. Hoffmann; Academic Press London 1989, page 319 ff and in particular page 320-321.

Carbon number analysis is a well-known technique in the art. A suitable description is e.g. given in EP 78,568. The terms "fat" and "oil" are used in this invention are synonyms. The term "liquid oil" is used in this invention refers to glyceride mixtures that are pourable at 5 degrees C. Preferably the solid fat content of the liquid oil is 0 at 20 degree C.

"Fractionation" is a process used for separation of high melting component from a feed stock, The higher melting solid fraction obtained is called as "stearin" fraction or hard fraction and lower melting liquid fraction is called "olein" fraction or soft fraction. Through out this illustrations, the term stearin fraction as well as term olein fraction means higher melting fraction and lower melting fraction, respectively.

Interesterification process is a well-known art and a more recent review of the same is published by Rozendaal & Macrae (1997). When interesterification process is carried out using alkali metal catalyst (0.1-0.2% sodium methoxide catalyst ((sodium methylate ($NaOCH_3$)-UN No. 143 also known as Natrium Methylate is used as catalyst), it leads to a random distribution of triglycerides in which the fatty acids are distributed randomly over the 1- 2- and 3-position of the glycerol moiety. The number of tri-glycerides produced by interesterifying a fatty mixture containing n fatty acids is: $\frac{1}{2}(n^2+n^3)$.

Since the process involved is of statistical nature, the final equilibrium triglyceride composition of the interesterified fat can be easily calculated and properties are easily predicted. The table-1 below gives the relationship in the number of fatty acids in the tri-glyceride mixture and number of tri-glycerides in fat mixture after chemical random interesterification

TABLE 1

| Number of fatty acids in the tri-glyceride mixture | Number of tri-glycerides in fat mixture after Interesterification |
|---|---|
| 2 | 6 |
| 3 | 18 |
| 4 | 40 |
| 5 | 75 |
| 6 | 126 |
| 7 | 196 |
| 8 | 288 |
| 9 | 405 |

It has been found that actual reaction product is always in line with the statistical prediction. In an edible plastic spread or margarine, hard stock contributes triglycerides especially of the tri-saturated type. A certain minimum quantity of these is essential to provide the "structuring effect" and to prevent oiling out of the liquid oil by providing temperature cycling stability.

From the patent literature and general experience, this minimum quantity requirement of such tri saturated tri-glycerides is around 6%. More is acceptable and desirable the limitation being the SAFA content limit in the fat blend if any. How ever, the amount of $H_3$ type tri-glycerides, and especially tri-stearin, should not exceed a 2% max limit. Because of it's high melt point as well as crystalline structure, if the level is greater than 2%, it can cause product complaint such as sandiness and graininess and result in poor mouth feel. Hence content of $H_2M$ type of triglycerides is valuable, to give the required structuring effect, at the same time with out giving raise to sandiness/graininess as well as poor mouth feel to the product. To achieve this, it is essential to use a fat/oil with lower carbon chain residues such as lauric oils. Random interesterification process resulted in the rearrangement of the fat triglyceride geometry.

When the hard stock components are interesterified, the amounts of tri-saturated triglycerides in the interesterified product are determined entirely by the content of saturated fatty acids in the blend. The amount of tri-saturated triglyceride in the product after random interesterification will be the cube of the amount of saturated fatty acid in the fat blend before interesterification. For example, the amount of tri-saturated tri-glycerides produced by interesterifying a fatty mixture containing 'm' level of saturated fatty acids (SAFA) is: $(m^3)$.

Because this relationship is very critical, as shown in the table-2 below, attempts are made to produce very hard palm as well as lauric fractions with very high levels of saturated fatty acids, which in turn will result in high levels of tri saturated tri-glycerides after random chemical interesterification process.

TABLE 2

| % SAFA in the fat Blend | % Tri-Saturated Tg's in the product |
|---|---|
| 10 | 0.1 |
| 20 | 0.8 |
| 30 | 2.7 |
| 40 | 6.4 |
| 50 | 12.50 |
| 60 | 21.60 |
| 67 | 30.00 |
| 80 | 51.20 |
| 85 | 61.41 |
| 90 | 72.90 |
| 91 | 75.36 |
| 92 | 77.87 |
| 93 | 80.44 |
| 94 | 83.60 |
| 95 | 85.74 |
| 100 | 100.00 |

Consider that the SAFA content of polyunsaturated margarine should not exceed 20% when using a fat level of 80% in the finished margarine. The fat blend is considered consisting of 80% sunflower oil as the PUFA oil to be used in the blend and 20% hard stock (high usage level). At this level of blend, the SAFA contributed by sunflower oil works out to 10.3%. This means that the maximum SAFA that can be contributed by the hard stock at usage level of 20%, cannot exceed 11.7% to be able not to exceed the 20% SAFA limit. Further the hard stock should contribute to minimum of 6% tri-saturated Tgs in the final blend.

This means that the hard stock should contribute to 6% tri-saturated triglycerides at the usage level of 20%. It can be seen from the above table-2 that the SAFA content of the hard stock must be about 67% so that interesterified hard stock has 30% tri-saturated triglyceride, which in turn will contribute to 6% tri-saturated triglycerides at 20% usage level.

Assuming only 15% hard stock is to be used, then the SAFA content of the hard stock must be about 74%, so that it has 40% tri-saturated triglyceride after interesterification. Further assuming that only 7% hard stock is to be used, then the SAFA content of the hard stock must be around 93.90% so that it has 82.79% tri-saturated triglycerides after interesterification.

These are minimum requirements and a higher amount of tri-saturated tri-glycerides would be desirable. How ever it is preferable to limit H3 type triglyceride in the blend to max 2% level to achieve good organolapitic characteristics.

The usage of hard structural fat in the blend can be 5 to 40% and the liquid oil or its blends can be 95-60%. Table 3 below gives the level of tri-saturated triglycerides in the margarine blend with two types of hard fats.

TABLE 3

| | Sunflower Oil | Hard Stock-A | Hard Stock-B | Blend-1 | Blend-2 |
|---|---|---|---|---|---|
| Sunflower Oil | 100% | | | 92.00% | 93.00% |
| Hard Stock-A | | 100% | | 8.00% | |
| Hard Stock-B | | | 100% | | 7.00% |
| C: 8 | | 0.72 | 0.48 | 0.06 | 0.03 |
| C: 10 | | 1.08 | 0.76 | 0.09 | 0.05 |

TABLE 3-continued

| | Sunflower Oil | Hard Stock-A | Hard Stock-B | Blend-1 | Blend-2 |
|---|---|---|---|---|---|
| C: 12 | | 21.14 | 17.1 | 1.69 | 1.20 |
| C: 14 | | 8.79 | 7.83 | 0.70 | 0.55 |
| C: 16 | 5.3 | 54.86 | 63.33 | 9.26 | 9.36 |
| C: 18:0 | 3.9 | 4.18 | 3.77 | 3.92 | 3.89 |
| C: 18:1 | 27.1 | 7.76 | 6.05 | 25.55 | 25.63 |
| C: 18:2 | 62.6 | 1.48 | 0.68 | 57.71 | 58.27 |
| SAFA | 9.2 | 90.77 | 93.27 | 15.73 | 15.08 |
| SSS | | 76.93 | 82.88 | 6.15 | 5.80 |
| HHH | | 17.06 | 26.84 | 1.36 | 1.88 |
| H2M | | 27.38 | 31.05 | 2.19 | 2.17 |

It could be seen from the above two examples that, even at very low usage levels of hard structural fat at 7 to 8%, the required tri-saturated triglycerides of H2M level in the blend could be achieved, at the same time restricting the level of H-3 type tri-glycerides below 2%. H-3 type triglycerides imparts adverse organoleptic properties in the final product and hence it is desired to keep the same at around 2% levels.

EXAMPLE-1

Hard Stock-A

Palm oil was fractioned using standard single stage melt crystallization method in a fractionation plant of a commercial scale to produce palm stearin fraction similar to the one commercially traded in the market. The capacity of the crystallizer used was 40,000 Kg per batch.

Palm oil was melted to and heated to 70 degrees C. and held at this temperature of at least 15 minutes so that the oil lost its crystal memory. The oil was then cooled to crystallize the hard palm fraction by control of water temperature as well as oil temperature such that oil temperature was brought down to 23 degrees C. The stearin fraction, which crystallized out, was then separated in a membrane type filter and squeezed to 4 bar to remove entrained liquid olein. After core blow, the medium hard stearin fraction was discharged to stearin tank kept below the membrane filter. The entire cycle took 8 hours. The iodine no of the stearin fraction obtained was 33. The yield of the stearin fraction was 20%.

This stearin fraction collected was again charged to another crystallizer and was heated again to 75 deg C. and held at this temperature for 15 minutes so that the oil lost its crystal memory. The oil was then cooled to crystallize the hard palm fraction by control of water temperature as well as oil temperature such that oil temperature was brought down to 48 Deg C. At this temperature mainly C-16 type of fats crystallized.

The cooled fat was filtered at 48 Deg C. through a high-pressure membrane filter with a chamber depth of 10 mm. (Netzch type) After filtration of each batch, the hard fraction collected in the chamber of the filter was subjected to progressive squeezing pressure to remove the occluded olein in the crystal matrix of the hard fraction. The squeezing pressure was increased up to 20 bar and then held at this pressure for 5 minutes. Thereafter, the filter was core blowed to remove all the feed slurry from the core of the press and the cake were discharged in to the Stearin tank.

The hard stearin fraction was tested to contain 80.77% C-16 fatty acid residues and 12.35% unsaturated fatty acid residues. The yield of the hard palm stearin fraction was 30%. Both fractionation steps yielded liquid fraction, which was valued in the trade at a higher value, compared to feed stock.

This hard palm fraction was then blend in the ratio of approx. 65% to 35% with hard commercially available palm kernel fraction having a C-12 level of 53.78%. The resultant mixture was randomly interesterified with 0.15% sodium methoxide catalyst ((sodium methylate (NaOCH$_3$)-UN No. 143 also known as Natrium Methylate) supplied by M/S.Degussa Huls. The interesterified mixture was washed with citric acid solution and bleached and deodorized. The resultant hard structural fat was found to have the desired specifications required in a hard structural fat. The analytical values of the blends used as well as resultant hard structural fat obtained are given in the Table 4A-Table-4 E below.

TABLE 4A

| Test | High C-16 hard palm fraction | Hard palm kernel oil fraction | Blended Fat before interesterification | After Interesterification |
|---|---|---|---|---|
| SFC-Deg C. | | | | |
| 20 | 92.1 | 84.2 | 88.7 | 92.5 |
| 25 | 92.1 | 70.4 | 79.4 | 85.2 |
| 30 | 90.9 | 33.3 | 65.6 | 72.5 |
| 35 | 88.4 | nil | 57.1 | 54.3 |
| 40 | 83.0 | | 49.9 | 33.7 |
| FAC | | | | |
| C8 | — | 1.88 | 0.72 | 0.72 |
| 10 | — | 2.69 | 1.08 | 1.08 |
| 12 | 0.13 | 53.78 | 21.14 | 21.14 |
| 14 | 1.32 | 22.2 | 8.79 | 8.79 |
| 16 | 80.77 | 9.19 | 54.86 | 54.86 |
| 18:0 | 5.43 | 2.24 | 4.18 | 4.18 |
| 18:1 | 10.15 | 6.95 | 7.76 | 7.76 |
| 18:2 | 2.20 | 1.06 | 1.48 | 1.48 |

TABLE 4B

Fatty acid profile of interesterified fat

| | | FATTY ACID | OVERALL % WT |
|---|---|---|---|
| Y | CAPRYLIC | C: 8 | 0.72 |
| C | CAPRIC | C: 10 | 1.08 |
| L | LAURIC | C: 12 | 21.14 |
| M | MYRISTIC | C: 14 | 8.79 |
| P | PALMITIC | C: 16 | 54.86 |
| S | STEARIC | C: 18-0 | 4.18 |
| O | OLEIC | C: 18-1 | 7.76 |
| L | LINOLEIC | C: 18-2 | 1.48 |

TABLE 4-C

Triglyceride Composition after interesterification reaction
(More than 1% mole level only taken in to account)

| TRIGLYCERIDE | % WT | C.NO |
|---|---|---|
| LLL | 1.33 | 36 |
| LLM | 1.02 | 38 |
| LLP | 5.94 | 40 |
| LMP | 2.27 | 42 |
| LPL | 2.97 | 40 |
| LPM | 2.27 | 42 |
| LPP | 13.21 | 44 |
| LPO | 1.76 | 46 |
| LOP | 1.76 | 46 |
| MLP | 2.27 | 42 |
| MPP | 5.04 | 46 |
| PLP | 6.61 | 44 |
| PLO | 1.76 | 46 |
| PMP | 2.52 | 46 |
| PPP | 14.6 | 48 |

TABLE 4-C-continued

Triglyceride Composition after interesterification reaction
(More than 1% mole level only taken in to account)

| TRIGLYCERIDE | % WT | C.NO |
|---|---|---|
| PPS | 2.09 | 50 |
| PPO | 3.89 | 50 |
| POP | 1.94 | 50 |
| H-3 TYPE (PPP + PPS) | 16.69% | 48 + 50 |

TABLE 4D

| TRIGLYCERIDE | % WT |
|---|---|
| SSS | 76.93 |
| SOS | 5.9 |
| SSO | 11.8 |
| SLS | 1.13 |
| SSL | 2.26 |
| SSU | 1.28 |
| USU | 0.64 |
| UUU | 0.06 |

The resulting hard structural fat was blended with fully refined sunflower oil at various ratios and the solid fat content was analyzed to find the best blend level for the manufacture of Margarine. The blending was done from 1% level to 20% level and the SFC profile of the blend is shown in the Table 5.

TABLE 5

| Hard Stock-A | Sunflower oil | SMP Deg °C. | SFC N-0 | SFC N-10 | SFC N-20 | SFC N-25 | SFC N-30 | SFC N-35 | SFC N-40 |
|---|---|---|---|---|---|---|---|---|---|
| 100 | 0 | 46.6 | 93.52 | 93.05 | 92.50 | 85.20 | 72.50 | 54.30 | 33.70 |
| 25 | 75 | 39.8 | 27.33 | 23.09 | 16.31 | 12.59 | 9.33 | 5.91 | 3.40 |
| 20 | 80 | 36.9 | 22.17 | 18.16 | 12.71 | 9.52 | 7.14 | 4.10 | 2.38 |
| 15 | 85 | 34.4 | 16.32 | 13.35 | 8.79 | 6.88 | 4.65 | 2.67 | 0.76 |
| 14 | 86 | 34.4 | 15.40 | 12.66 | 8.12 | 6.20 | 4.32 | 2.23 | 0.60 |
| 13 | 87 | 34.4 | 14.32 | 11.73 | 7.24 | 5.41 | 3.78 | 2.10 | 0.51 |
| 12 | 88 | 34.4 | 12.88 | 10.87 | 6.31 | 5.03 | 3.04 | 1.71 | nil |
| 11 | 89 | 32.8 | 11.22 | 9.93 | 6.08 | 4.73 | 2.80 | 1.60 | nil |
| 10 | 90 | 30.0 | 11.41 | 9.00 | 5.85 | 4.20 | 2.62 | 1.84 | nil |
| 9 | 91 | 30.0 | 10.02 | 8.03 | 4.92 | 3.51 | 2.33 | 1.50 | nil |
| 8 | 92 | 30.0 | 8.71 | 7.09 | 4.00 | 2.84 | 2.06 | 1.28 | nil |
| 7 | 93 | 29.4 | 8.01 | 6.08 | 3.12 | 2.50 | 1.60 | 0.60 | nil |
| 6 | 94 | 27.6 | 7.32 | 5.14 | 2.51 | 2.44 | 1.18 | 0.49 | nil |
| 5 | 95 | 21.4 | 5.84 | 4.34 | 1.96 | 2.00 | 0.76 | 0.36 | nil |
| 0 | 100 | 0 | 0.05 | nil | | | | | |

Margarine was produced using a blend level of 7% hard structural fat with 93% sunflower oil and following composition was used.

| Oil Blend | 82.000% |
|---|---|
| Water | 16.000% |
| Salt | 2.000% |
| Flavor | 0.010% |
| Dimodan PV Distilled Momo Glyceride | 0.300% |
| B Carotene | 0.00300% |

The mixture was process through a pilot plant supplied by Schroder Kombinator through a conventional A-A-C sequence with a throughput of 10 Kg per hour. Exit temperature of A unit was 17 Deg C. and that of second A unit was 12 deg C. The exit temperature of the product was 8.8 deg C. The rpm of the pin worker was maintained at 200. The margarine produced was found to be soft, shining, of good spreadability and imparted good salt release. The solid fat profile of the blend after tempering for 1 hour as well as 16 hours at 0 Deg C. is given as below:

TABLE 6

| | Tempering at 0 Deg C. for | |
|---|---|---|
| | 60 minutes | 16 hours |
| N 10 | 6.08 | 6.70 |
| N 20 | 3.12 | 3.60 |
| N 25 | 2.50 | 2.95 |
| N 30 | 1.60 | 1.85 |
| N 35 | 0.60 | 0.50 |

EXAMPLE-2

Hard Stock-B

Palm oil was fractioned using standard melt crystallization process method to produce Palm stearin fraction as given in the Example 1. This stearin fraction was then subjected to another melt crystalization step and the slurry was filtered at a higher temperature of 52 Deg C. through a high-pressure membrane filter as per example 1. (Netzch type) After filtration of each batch, the hard fractionation collected in the chamber of the filter was subjected to progressive squeezing pressure to remove the occluded olein in the crystal matrix of the hard fraction. The squeezing pressure was increased up to 30 bar and then held at this pressure for 10 minutes. There after the filter was core blowed to remove all the feed slurry from the core of the press and the cake were discharged in to the Stearin tank. The hard stearin fraction was tested to contain 86.53% of C-16 fatty acid residues and 7.47% unsaturated fatty acid residues.

This hard palm fraction was then blend in the ratio of approx. 70%/30% with extra palm kernel fraction obtained by hard setting and fractionation of Palm Kernel oil and having a C-12 level of 56.71%, and unsaturated fatty acid residue level of 6.73%.

The resultant mixture was randomly interesterified with 0.15% sodium methoxide catalyst. The interesterified mixture was washed with citric acid solution and bleached and deodorized. The resultant hard structural fat was found to have the desired characteristics required in a hard structural fat. The details are given in the Table 7 below.

TABLE 7A

| Test | High C-16 hard palm oil fraction | Hard palm kernel oil fraction | Blended Fat before interesterification | After Interesterification |
|---|---|---|---|---|
| SFC | | | | |
| 20 | 925 | 90.1 | 91.8 | 92.5 |
| 25 | 92.1 | 79.6 | 88.4 | 91.37 |
| 30 | 91.4 | 45.4 | 77.6 | 84.3 |
| 35 | 886 | 0.1 | 62.1 | 71.3 |
| 40 | 86.04 | nil | 60.2 | 52.1 |
| FAC | | | | |
| C8 | — | 1.59 | 0.72 | 0.48 |
| 10 | — | 2.53 | 1.08 | 0.76 |
| 12 | 0.13 | 56.71 | 21.14 | 17.1 |
| 14 | 1.24 | 23.19 | 8.79 | 7.83 |
| 16 | 86.53 | 8.41 | 54.86 | 63.33 |
| 18:0 | 4.63 | 2.58 | | 3.77 |
| 18:1 | 6.71 | 4.5 | | 6.05 |
| 18:2 | 0.76 | 0.49 | | 0.68 |

TABLE 7-B

Fatty Acid profile of interesterified fat

| | DESCRIPTION | FATTY ACID | OVERALL % WT |
|---|---|---|---|
| Y | CAPRYLIC | C: 8 | 0.52 |
| C | CAPRIC | C: 10 | 0.81 |
| L | LAURIC | C: 12 | 17.68 |
| M | MYRISTIC | C: 14 | 8.51 |
| P | PALMITIC | C: 16 | 59.71 |
| S | STEARIC | C: 18-0 | 5.35 |
| O | OLEIC | C: 18-1 | 6.39 |
| L | LINOLEIC | C: 18-2 | 1.03 |

TABLE 7-C

| CARBON NO | % WT |
|---|---|
| 34 | 0.20 |
| 36 | 0.40 |
| 38 | 2.32 |
| 40 | 3.04 |
| 42 | 11.03 |
| 44 | 10.55 |
| 46 | 23.26 |
| 48 | 17.05 |
| 50 | 19.14 |
| 52 | 10.48 |
| 54 | 2.32 |

TABLE 7-D

| TRIGLYCERIDE | % WT |
|---|---|
| SSS | 81.04 |
| SOS | 5.06 |
| SSO | 10.12 |
| SLS | 0.82 |
| SSL | 1.64 |
| SSU | 0.85 |
| USU | 0.43 |
| UUU | 0.03 |

The resulting trans free interesterified hard fat was blended with fully refined sunflower oil at various ratios and the solid fat was analyzed to find the best blend level for the manufacture of Margarine. The blending was done from 1% level to 15% level and the SFC profile is shown in Table 8.

TABLE 8

| Sunflower oil | Hard Stock-B | SFC Deg C. | | | | | |
|---|---|---|---|---|---|---|---|
| | | 10 | 20 | 25 | 30 | 35 | 40 |
| 100 | 0 | — | — | — | — | — | — |
| 99 | 1 | 0.61 | 0.1 | 0.17 | 0.03 | nil | nil |
| 98 | 2 | 1.63 | 0.73 | 0.42 | 0.17 | nil | nil |
| 97 | 3 | 2.69 | 1.14 | 0.94 | 0.49 | 0.03 | nil |

TABLE 8-continued

| Sunflower oil | Hard Stock-B | SFC Deg C. | | | | | |
|---|---|---|---|---|---|---|---|
| | | 10 | 20 | 25 | 30 | 35 | 40 |
| 96 | 4 | 3.74 | 1.83 | 1.61 | 0.67 | 0.18 | nil |
| 95 | 5 | 4.69 | 2.04 | 1.92 | 1.42 | 0.58 | nil |
| 94 | 6 | 5.64 | 2.82 | 2.73 | 1.61 | 0.77 | nil |
| 93 | 7 | 6.73 | 3.55 | 3.34 | 2.18 | 1.2 | nil |
| 92 | 8 | 7.62 | 4.11 | 3.81 | 2.59 | 1.28 | 0.23 |
| 91 | 9 | 8.59 | 4.86 | 4.4 | 3.17 | 1.97 | 0.44 |
| 90 | 10 | 9.68 | 5.63 | 5.14 | 3.31 | 2.07 | 0.55 |
| 89 | 11 | 10.53 | 6.42 | 5.72 | 3.91 | 2.26 | 1 |
| 88 | 12 | 11.74 | 7 | 6.38 | 4.16 | 2.76 | 1.21 |
| 87 | 13 | 12.66 | 7.62 | 7.04 | 4.95 | 3.01 | 1.49 |
| 86 | 14 | 13.49 | 8.17 | 7.57 | 5.6 | 3.6 | 1.7 |
| 85 | 15 | 14.67 | 9.32 | 8.5 | 6.06 | 3.84 | 1.94 |
| 0 | 100 | 96.72 | 92.50 | 91.37 | 84.30 | 71.35 | 52.10 |

This hard stock and blended with fully refined sunflower oil in a ratio of 7:93 to give a margarine fat blend. The SAFA content of the blend was 18%, the content of trans unsaturated fatty acid residues was negligible. From this blend a spread was manufactured with a composition as described in Example I.

The mixture was processed through a pilot plant supplied by Schroder Kombinator a through a conventional A-A-C sequence with a throughput of 10 Kg per hour. Exit temperature of A unit was 17 Deg C. and that of second A unit was 12 deg C. The exit temperature of the product was 8.8 deg C. The rpm of the pin worker was maintained at 200.

The margarine produced was found to be soft, shining, of good spreadability and imparted good salt release. The solid fat profile of the blend after tempering for 1 hour as well as 16 hours at 0 Deg C. is given as below:

TABLE 9

| Tempering | 1 hour | 16 hours |
|---|---|---|
| N10 | 7.0 | 7.6 |
| N20 | 4.2 | 4.7 |
| N30 | 1.6 | 1.9 |
| N35 | 1.0 | 1.0 |

The product showed good spread ability properties, plasticity and exhibited excellent melting behavior. It was soft and shiny with good salt release.

It could be seen from the above Examples that the hard structural fat of the current invention had the similar properties in the margarine formulation compared to the hard fat as described in prior art.

EXAMPLE-3

Hard Stock C

Hard structural fat of Example 1 was subject to panning and pressing after hard setting at a temperature of 28-29 Deg C. The hard-set fat was then covered in filter cloth and subjected to a very high pressure of 50 Kg/Cm$^2$ in a commercial Sperry hydraulic press specially developed for this application. The Pressing was applied gradually to max level in 90-minute period. The olein fraction was collected in drip tray. The Hard stearin fraction was removed from the press and melted. This resulted in a yield of 81% very hard structural fat stearin fraction.

The analytical values of the extra hard stearin fraction (extra hard trans free structural fat) are given in the table-10 below:

TABLE 10

Fractionation of Interesterified Hard Structural fat

| | Values | | |
|---|---|---|---|
| | Hard fat used as Feed stock | Stearin Fraction Obtained Hard stock-C | Olein Fraction obtained |
| | | % Yield | |
| | | 81 | 19 |
| | SFC by NMR Deg C.- % | | |
| N-20 | 92.5 | 92.60 | 58.74 |
| N-25 | 85.2 | 92.00 | 41.36 |
| N-30 | 72.5 | 84.30 | 21.74 |
| N-35 | 54.3 | 70.30 | 4.62 |
| N-40 | 33.7 | 50.10 | 0.00 |
| | FAC | | |
| C-8 | 67.00 | 0.52 | 1.13 |
| C-10 | 0.95 | 0.81 | 1.34 |
| C-12 | 17.25 | 17.66 | 21.38 |
| C-14 | 8.24 | 8.50 | 7.45 |
| C-16 | 58.31 | 59.66 | 46.95 |
| C-18 | 4.96 | 5.35 | 3.95 |
| C-18:1 | 8.16 | 6.38 | 15.92 |
| C-18:2 | 1.45 | 1.03 | 1.87 |

It could be seen from the above example that the panning and pressing of our novel Hard Interesterified structural fat resulted in an yield of 81% Extra hard stearin fraction which matches with example X1 of U.S. Pat. No. 6,156,370 at the same time resulting in much higher yield ratios The olein fraction obtained had lower solid fat profile compared to prior art.

For the purpose of comparison with respect to the functionalities of this novel structural fat (hard stock A,B and various examples of solid fat content of the fat blend as given in the prior art U.S. Pat. No. 6,156,370 product, (structural fat in blend with sunflower oil) is summarized below in Table 11. The example numbers given in this table refers to the examples as given in the prior art patent.

TABLE 11

| Examples | SFO % | Hard Fat % | %-SFC | | | | |
|---|---|---|---|---|---|---|---|
| | | | 10° C. | 20° C. | 25° C. | 30° C. | 35° C. |
| Hard stock-A | 92 | 8 | 7.09 | 4.00 | 2.84 | 2.06 | 1.28 |
| Hard stock-B | 92 | 8 | 7.62 | 4.62 | 3.81 | 2.59 | 1.28 |
| Hard stock-C | 92 | 8 | 7.40 | 4.51 | 3.34 | 2.10 | 1.20 |

TABLE 11-continued

| Examples | SFO % | Hard Fat % | %-SFC 10° C. | 20° C. | 25° C. | 30° C. | 35° C. |
|---|---|---|---|---|---|---|---|
| Ex-1- U.S. Pat. No. 6,156,370 | 92 | 8 | 7.80 | 4.20 | | 2.30 | 0.70 |
| Ex-11 U.S. Pat. No. 6,156,370 | 92 | 8 | 7.00 | 4.20 | | 1.60 | 1.00 |
| Ex-111 U.S. Pat. No. 6,156,370 | 92 | 8 | 6.80 | 3.70 | 2.20 | 0.90 | 0.00 |
| Ex-111 U.S. Pat. No. 6,156,370 | 90 | 10 | 9.20 | 4.70 | 2.80 | 1.90 | 0.20 |
| Ex-1V U.S. Pat. No. 6,156,370 | 92 | 8 | 8.60 | 6.30 | 4.80 | 3.80 | 2.70 |
| Ex V11 U.S. Pat. No. 6,156,370 | 92.5 | 7.50 | 7.30 | 4.90 | | 2.80 | 1.90 |
| Ex X U.S. Pat. No. 6,156,370 | 92 | 8 | 8.30 | 4.80 | | 2.10 | 0.60 |
| Ex-X1 U.S. Pat. No. 6,156,370 | 92 | 8 | 7.70 | 5.00 | | 2.60 | 1.50 |
| Ex-X11 U.S. Pat. No. 6,156,370 | 92 | 8 | 8.60 | 5.90 | | 3.60 | 2.40 |

Ex-1 to Ex-X11 are the Solid fat content (SFC) profiles as given in the U.S. Pat. No. 6,156,370. Hard stock A and Hard stock B, hard stock C relates to the trans free hard structural fat obtained under Example 1 and example 2 and example 3 of this invention.

It could be seen, that through the current invention, we could produce a hard structural fat of similar qualities as prior art product, but the process involved in the new art is much more economical and yield of the structural fat was much higher for commercial exploitation. The margarine produced by using the structural fat of current invention with similar in quality compared to prior art products.

While the invention has been described with reference to specific embodiments, modifications and variations of the inventions may be constructed with out departing from the scope of the invention, which is defined in the following claims.

The invention claimed is:

1. A method of producing hard palm oil stearin fraction, comprising:
   selectively dry fractionating palm oil or a stearin fraction thereof, by a melt crystallization process;
   separating said hard palm oil stearin fraction from a crystallized slurry of said palm oil or said stearin fraction thereof in a high pressure membrane filter at a squeezing pressure exceeding 10 bar by inflating membranes of said high pressure membrane filter;
   said hard palm oil stearin fraction recovered as filter cake having a C16 carbon chain fatty acid residue level of at least 70%; and
   in said separating step, said high pressure membrane filter having a chamber depth of at most 35 millimeter.

2. A method of producing hard palm oil stearin fraction according to claim 1, further comprising:
   said hard palm oil stearin fraction being produced using a two-step melt crystallization process of said palm oil or said stearin fraction thereof;
   a first step of said two-step melt crystallization process comprising crystallizing said palm oil or said stearin fraction thereof at a temperature between about 20 and 25 degrees Celsius and separating a crystallized slurry of said palm oil or said stearin fraction thereof through a filter, said first step producing a medium hard palm stearin fraction having an iodine value varying from about 26 to about 40;
   a second step of said two-step melt crystallization process comprising crystallizing said medium hard palm stearin fraction at a temperature between about 40 to about 55 degrees Celsius and filtering a crystallized slurry of said medium hard palm stearin fraction through said high pressure membrane filter; and
   said second step producing a very hard palm stearin fraction with a C16 carbon chain fatty acid residue level of at least 70%.

* * * * *